United States Patent
Wu et al.

(10) Patent No.: US 12,308,977 B2
(45) Date of Patent: May 20, 2025

(54) METHOD AND APPARATUS FOR DETERMINING HARQ-ACK CODEBOOK, AND DEVICE AND STORAGE MEDIUM

(71) Applicant: GUANGDONG OPPO MOBILE TELECOMMUNICATIONS CORP., LTD., Dongguan (CN)

(72) Inventors: Zuomin Wu, Dongguan (CN); Yanan Lin, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 318 days.

(21) Appl. No.: 17/838,618

(22) Filed: Jun. 13, 2022

(65) Prior Publication Data
US 2022/0311559 A1    Sep. 29, 2022

Related U.S. Application Data

(63) Continuation of application No. PCT/CN2020/073983, filed on Jan. 23, 2020.

(51) Int. Cl.
*H04L 1/1829* (2023.01)
*H04W 72/23* (2023.01)

(52) U.S. Cl.
CPC ........... *H04L 1/1861* (2013.01); *H04W 72/23* (2023.01)

(58) Field of Classification Search
None
See application file for complete search history.

(56) References Cited

U.S. PATENT DOCUMENTS

2019/0074937 A1    3/2019  Bhattad et al.
2019/0103943 A1*   4/2019  Wang .................... H04L 1/1854
(Continued)

FOREIGN PATENT DOCUMENTS

CN    103580827 A    2/2014
CN    109474391 A    3/2019
(Continued)

OTHER PUBLICATIONS

International Search Report dated Oct. 27, 2020 from the International Searching Authority Re. Application No. PCT/CN2020/073983, 6 pages.
(Continued)

*Primary Examiner* — Ayman A Abaza
*Assistant Examiner* — Camquyen Thai
(74) *Attorney, Agent, or Firm* — BAYES PLLC

(57) ABSTRACT

Provided are a method and apparatus for determining a Hybrid Automatic Repeat Request Acknowledgement (HARQ-ACK) codebook, and a device and a storage medium. The method includes generating first feedback information, the first feedback information including feedback information for a first physical channel, the first physical channel being a physical channel corresponding to a first HARQ process on a first cell, the first cell supporting a CBG-based feedback mode, and the first physical channel does not correspond to a CBG-based transmission mode; and determining a target feedback sequence. The target feedback sequence includes feedback information ordered based on HARQ process numbers in N cells, the N cells includes the first cell, the feedback information ordered based on HARQ process numbers in the N cells includes the first feedback information, and N is a positive integer.

20 Claims, 10 Drawing Sheets

Generate first feedback information, wherein the first feedback information includes feedback information for a first physical channel, the first physical channel is a physical channel corresponding to a first HARQ process on a first cell, the first cell supports a CBG-based feedback mode, and the first physical channel does not correspond to a CBG-based transmission mode — 201

Determine a target feedback sequence, wherein the target feedback sequence includes feedback information ordered based on HARQ process numbers in N cells, the N cells includess the first cell, the feedback information ordered based on HARQ process numbers in the N cells includes the first feedback information, and N is a positive integer — 202

(56) References Cited

U.S. PATENT DOCUMENTS

| | | | |
|---|---|---|---|
| 2019/0335435 A1 | 10/2019 | Gou et al. | |
| 2019/0342035 A1* | 11/2019 | Zhang | H04L 5/0055 |
| 2019/0363840 A1 | 11/2019 | Wang et al. | |
| 2020/0213044 A1* | 7/2020 | Peng | H04L 1/1864 |
| 2020/0220663 A1* | 7/2020 | Tsai | H04L 1/1822 |
| 2021/0135791 A1* | 5/2021 | Wang | H04W 72/20 |
| 2022/0368475 A1* | 11/2022 | Lei | H04L 1/1822 |

FOREIGN PATENT DOCUMENTS

| | | | |
|---|---|---|---|
| CN | 109586877 A | 4/2019 | |
| CN | 110086583 A | 8/2019 | |
| CN | 110138523 A | 8/2019 | |
| CN | 110708146 A | 1/2020 | |
| EP | 4057745 B1 | 6/2024 | |
| WO | 2019027308 A1 | 2/2019 | |
| WO | 2019099569 A1 | 5/2019 | |
| WO | 2019137243 A1 | 7/2019 | |
| WO | 2019144833 A1 | 8/2019 | |
| WO | 2020003442 A1 | 1/2020 | |
| WO | 2020003525 A1 | 1/2020 | |

OTHER PUBLICATIONS

Written Opinion dated Oct. 27, 2020 from the International Searching Authority Re. Application No. PCT/CN2020/073983, 6 pages.
"Discussion on HARQ-ACK codebook design for CBG", Source: CMCC, 3GPP TSG RAN WG1 Meeting AH 1801, R1-1800549, Vancouver, Canada, Jan. 22-26, 2018, 4 pages.
"Discussion on CBG-based feedback", Source: Huawei, HiSilicon, 3GPP TSG RAN WG1 Meeting #90, R1-1712202, Prague, Czech Republic, Aug. 21-25, 2017, 4 pages.
"UL control signalling for CBG-based (re)transmission", Source: NTT Docomo, Inc., 3GPP TSG RAN WG1 Nr Ad-Hoc#2, R1-1711114, Qingdao, P.R. China, Jun. 27-30, 2017, 4 pages.
"On CBG-based (re)transmission", Source: ZTE, Sanechips, 3GPP TSG RAN WG1 Meeting 91, R1-1719492, Reno, USA, Nov. 27-Dec. 1, 2017, 9 pages.
"Status Report to TSG", 3GPP TSG RAN meeting #86, RP-193196 (revision of RP-193063), Sitges, Spain, Dec. 9-12, 2019, 57 pages.
"Procedures for Code Block Group Based Transmissions", Source: Ericsson, 3GPP TSG RAN WG1 Meeting AH 1801, R1-1800952, Vancouver, Canada, Jan. 22-26, 2018, 5 pages.
"Clarification on Type-2 HARQ-ACK codebook determination in TS 38.213", Source: Fujitsu, 3GPP TSG RAN WG1 Meeting AH 1801, R1-1800128, Vancouver, Canada, Jan. 22-26, 2018, 10 pages.
First Office Action issued in corresponding Japanese application No. 2022-544849, mailed Jul. 18, 2023.
Notice of Allowance issued in corresponding Chinese application No. 202210468104.X, mailed Aug. 9, 2023.
First Office Action issued in corresponding European application No. 20915638.9, mailed Aug. 22, 2023.
First Office Action issued in corresponding Canadian application No. 3,165,814, mailed Aug. 23, 2023.
3GPP TSG RAN Meeting #86; RP-193122; Sitges, Spain, Dec. 9-12, 2019; Title: Introduction of shared spectrum channel access; Source to TSG: Samsung.
3GPP TSG RAN WG1 Meeting 91; R1-1720876; Reno, USA, Nov. 27-Dec. 1, 2017; Source: Wilus Inc.; Title: Discussion on HARQ-ACK multiplexing and bundling for NR.
3GPP TSG RAN WG1 Meeting #90; R1-1714161; Prague, Czech Republic, Aug. 21-25, 2017; Source: InterDigital Inc.; Title: HARQ feedback design aspects for CBG based transmission.
First Office Action issued in corresponding Indian application No. 202227033397, mailed Sep. 27, 2022.
Extended European Search Report issued in corresponding European application No. 20915638.9, mailed Oct. 19, 2022.
Zte et al., "Remaining issues for CBG", R1-1800139, 3GPP TSG RAN WG1 Meeting AH 1801 Vancouver, Canada, Jan. 22-26, 2018.
Huawei et al., "On CBG-based (re)transmission", R1-1719400, 3GPP TSG RAN WG1 Meeting #91 Reno, USA, Nov. 27-Dec. 1, 2017.
Huawei et al., "Summary of remaining issues on CBG-based (re)transmission", R1-1800075, 3GPP TSG RAN WG1 Ad Hoc Meeting Vancouver, Canada, Jan. 22-26, 2018.
Priority Review issued in corresponding Chinese application No. 202210468104.X, mailed May 15, 2023.
First Office Action issued in corresponding Chinese application No. 202210468104.X, mailed May 26, 2023.
Guangdong OPPO Mobile Telecom, "Discussion on HARQ-ACK feedback for CBG-based transmission", R1-1710169, 3GPP TSG RAN WG1 Nr Ad-Hoc#2 Qingdao, P.R. China Jun. 27-30, 2017.
Second Office Action issued in corresponding Canadian Application No. 3,165,814, mailed on Nov. 27, 2024, 4 pages.
First Office Action issued in corresponding Vietnamese Application No. 1-2022-05336, mailed on Sep. 9, 2024, 4 pages.

* cited by examiner

100

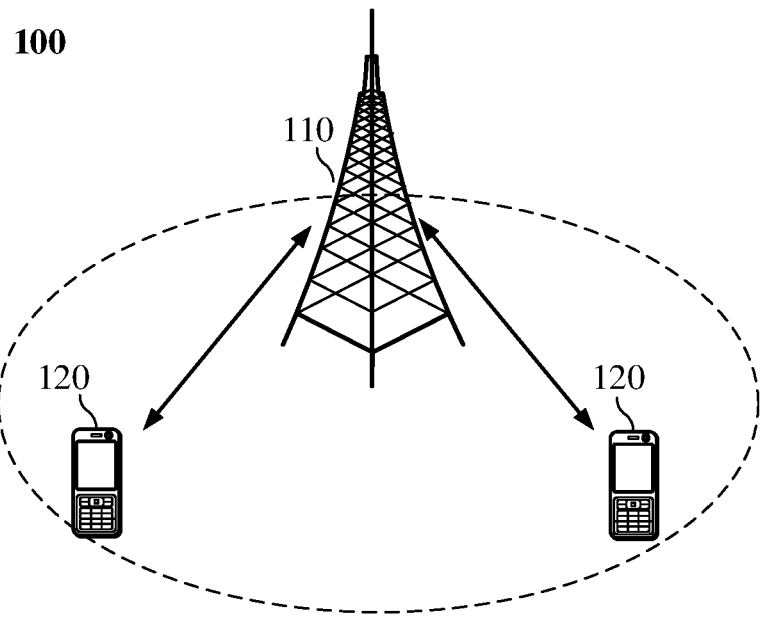

FIG. 1

Generate first feedback information, wherein the first feedback information includes feedback information for a first physical channel, the first physical channel is a physical channel corresponding to a first HARQ process on a first cell, the first cell supports a CBG-based feedback mode, and the first physical channel does not correspond to a CBG-based transmission mode  —201

Determine a target feedback sequence, wherein the target feedback sequence includes feedback information ordered based on HARQ process numbers in N cells, the N cells includess the first cell, the feedback information ordered based on HARQ process numbers in the N cells includes the first feedback information, and N is a positive integer  —202

FIG. 2

FIG. 3

| ACK0/NACK0 | ACK0/NACK0 | ACK0/NACK0 | ACK0/NACK0 |
|---|---|---|---|

FIG. 4

| ACK0/NACK0 | NACK | NACK | NACK | NACK | NACK | NACK | NACK |
|---|---|---|---|---|---|---|---|

FIG. 5

| ACK0/NACK0 | ACK0/NACK0 | ACK0/NACK0 | ACK0/NACK0 | NACK | NACK | NACK | NACK |
|---|---|---|---|---|---|---|---|

| ACK0/NACK0 | NACK | NACK | ACK1/NACK1 | NACK | NACK | NACK |

FIG. 10

| ACK0/NACK0 | ACK0/NACK0 | ACK0/NACK0 | ACK1/NACK1 | ACK1/NACK1 | ACK1/NACK1 | ACK1/NACK1 |

FIG. 11

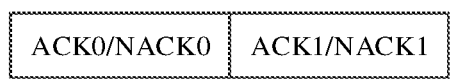

FIG. 12

| feedback information for HARQ0 | feedback information for HARQ1 | feedback information for HARQ2 | feedback information for HARQ3 |
|---|---|---|---| cell 0

| feedback information for HARQ4 | feedback information for HARQ5 | feedback information for HARQ6 | feedback information for HARQ7 |
|---|---|---|---| cell 0

| feedback information for HARQ8 | feedback information for HARQ9 | feedback information for HARQ10 | feedback information for HARQ11 |
|---|---|---|---| cell 0

| feedback information for HARQ12 | feedback information for HARQ13 | feedback information for HARQ14 | feedback information for HARQ15 |
|---|---|---|---| cell 0

| feedback information for HARQ0 | feedback information for HARQ1 | feedback information for HARQ2 | feedback information for HARQ3 |
|---|---|---|---| cell 1

| feedback information for HARQ4 | first feedback information | feedback information for HARQ6 | feedback information for HARQ7 |
|---|---|---|---| cell 1

FIG. 13

| feedback information for HARQ0 | feedback information for HARQ1 | feedback information for HARQ2 | feedback information for HARQ3 | cell 0

| feedback information for HARQ4 | feedback information for HARQ5 | feedback information for HARQ6 | feedback information for HARQ7 | cell 0

| first feedback information 1 | feedback information for HARQ9 | feedback information for HARQ10 | feedback information for HARQ11 | cell 0

| feedback information for HARQ12 | feedback information for HARQ13 | feedback information for HARQ14 | feedback information for HARQ15 | cell 0

| feedback information for HARQ0 | first feedback information 2 | feedback information for HARQ2 | feedback information for HARQ3 | cell 1

| feedback information for HARQ4 | feedback information for HARQ5 | feedback information for HARQ6 | feedback information for HARQ7 | cell 1

| feedback information for HARQ8 | feedback information for HARQ9 | feedback information for HARQ10 | feedback information for HARQ11 | cell 1

| feedback information for HARQ12 | feedback information for HARQ13 | feedback information for HARQ14 | feedback information for HARQ15 | cell 1

FIG. 17

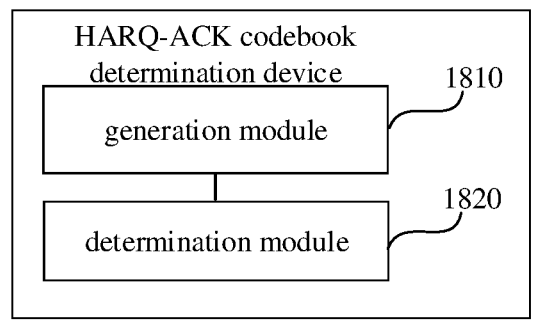

FIG. 18

METHOD AND APPARATUS FOR DETERMINING HARQ-ACK CODEBOOK, AND DEVICE AND STORAGE MEDIUM

CROSS-REFERENCE TO RELATED APPLICATION

This application is a continuation application of an International Application No. PCT/CN2020/073983, filed on Jan. 23, 2020, the contents of which is incorporated herein by reference in its entirety.

TECHNICAL FIELD

Embodiments of the present disclosure generally relate to communication technologies, and more particularly, to a HARQ-ACK codebook determination method, a device, an apparatus and a storage medium.

BACKGROUND

A Hybrid Automatic Repeat Request Acknowledgement (HARQ-ACK) codebook feedback mode is introduced in the New Radio-based Access To Unlicensed Spectrum (NR-U) system, namely Type-3 HARQ-ACK codebook feedback, or referred to as one-shot HARQ-ACK codebook feedback. A network device can configure one-shot HARQ-ACK codebook feedback for a terminal device, and trigger through Downlink Control Information (DCI) the terminal device to execute the one-shot HARQ-ACK codebook feedback. The one-shot HARQ-ACK codebook feedback includes feedback information corresponding to all HARQ processes on cells configured in a Physical Uplink Control Channel (PUCCH) group. At present, the determination of one-shot HARQ-ACK codebook has become a research hotspot.

SUMMARY

Embodiments of the present disclosure provide a HARQ-ACK codebook determination method, a device, an apparatus and a storage medium, which can solve the determination problem of the one-shot HARQ-ACK codebook. The technical solutions are as follows:

According to an aspect, there is provided a HARQ-ACK codebook determination method, including:
generating first feedback information, wherein the first feedback information includes feedback information for a first physical channel, the first physical channel is a physical channel corresponding to a first Hybrid Automatic Repeat Request (HARQ) process on a first cell, the first cell supports a Code Block Group (CBG)-based feedback mode, and the first physical channel does not correspond to a CBG-based transmission mode; and
determining a target feedback sequence, wherein the target feedback sequence includes feedback information ordered based on HARQ process numbers in N cells, the N cells comprises the first cell, the feedback information ordered based on HARQ process numbers in the N cells includes the first feedback information, and N is a positive integer.

According to another aspect, there is provided a HARQ-ACK codebook determination device, including:
a generation module configured to generate first feedback information, wherein the first feedback information includes feedback information for a first physical channel, the first physical channel is a physical channel corresponding to a first Hybrid Automatic Repeat Request (HARQ) process on a first cell, the first cell supports a Code Block Group (CBG)-based feedback mode, and the first physical channel does not correspond to a CBG-based transmission mode; and
a determination module configured to determine a target feedback sequence, wherein the target feedback sequence includes feedback information ordered based on HARQ process numbers in N cells, the N cells comprises the first cell, the feedback information ordered based on HARQ process numbers in the N cells includes the first feedback information, and N is a positive integer.

According to another aspect, there is provided a device including a processor and a memory, wherein the memory stores at least one instruction, and when the at least one instruction is executed by the processor, the processor is configured to implement the HARQ-ACK codebook determination method according to any one of the methods in the above aspect.

According to another aspect, there is provided a computer-readable storage medium memory having at least one instruction stored thereon, wherein when the at least one instruction is executed by a processor, the processor is configured to implement the HARQ-ACK codebook determination method according to any one of the methods in the above aspect.

According to another aspect, there is provided a computer program product. The computer program product includes one or more computer programs. When the computer programs are executed by a processor, the processor is caused to perform the HARQ-ACK codebook determination method according to any one of the methods in the above aspect.

The beneficial effects brought by the technical solutions provided in the embodiments of the present disclosure include at least the following:

The first feedback information is generated. The first feedback information includes feedback information for a first physical channel, the first physical channel is a physical channel corresponding to a first HARQ process on a first cell, the first cell supports a CBG-based feedback mode, and the first physical channel does not correspond to a CBG-based transmission mode. The target feedback sequence is determined. The target feedback sequence includes feedback information ordered based on HARQ process numbers in N cells, the N cells includes the first cell, the feedback information ordered based on HARQ process numbers in the N cells includes the first feedback information, and N is a positive integer. In embodiments of the present disclosure, a method for determining a HARQ-ACK codebook is proposed when the first physical channel does not correspond to the CBG-based transmission mode, but the first cell supports the CBG-based feedback mode.

BRIEF DESCRIPTION OF THE DRAWINGS

In order to illustrate the technical solutions in embodiments of the present disclosure more clearly, the following briefly introduces drawings that are used in the description of the embodiments. Obviously, the drawings in the following description are only some embodiments of the present disclosure. For those of ordinary skill in the art, other drawings can also be obtained from these drawings without creative effort.

FIG. 1 is a schematic diagram of an implementation environment according to an example embodiment of the present disclosure.

FIG. 2 is a flowchart of a HARQ-ACK codebook determination method according to an example embodiment of the present disclosure.

FIG. 3 is a schematic diagram of a HARQ-ACK codebook according to an example embodiment of the present disclosure.

FIG. 4 is a schematic diagram of a HARQ-ACK codebook according to another example embodiment of the present disclosure.

FIG. 5 is a schematic diagram of a HARQ-ACK codebook according to another example embodiment of the present disclosure.

FIG. 6 is a schematic diagram of a HARQ-ACK codebook according to another example embodiment of the present disclosure.

FIG. 9 is a schematic diagram of a HARQ-ACK codebook according to another example embodiment of the present disclosure.

FIG. 10 is a schematic diagram of a HARQ-ACK codebook according to another example embodiment of the present disclosure.

FIG. 11 is a schematic diagram of a HARQ-ACK codebook according to another example embodiment of the present disclosure.

FIG. 12 is a schematic diagram of a HARQ-ACK codebook according to another example embodiment of the present disclosure.

FIG. 13 is a schematic diagram of a HARQ-ACK codebook according to another example embodiment of the present disclosure.

FIG. 17 is a schematic diagram of a HARQ-ACK codebook according to another example embodiment of the present disclosure.

FIG. 18 is a schematic structural diagram of a HARQ-ACK codebook determination device according to an example embodiment of the present disclosure.

DETAILED DESCRIPTION

Figure 7:
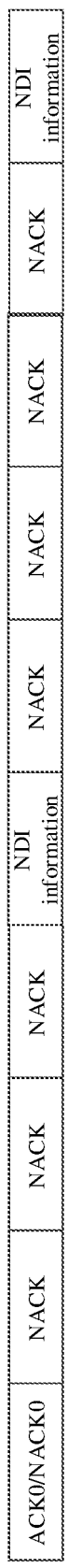
FIG. 7 is a schematic diagram of a HARQ-ACK codebook according to another example embodiment of the present disclosure.

In order to make the objectives, technical solutions and advantages of the present disclosure clearer, embodiments of the present disclosure will be further described in detail below with reference to the accompanying drawings.

Before the HARQ codebook determination method according to embodiments of the present disclosure is introduced in detail, relevant knowledge, application scenarios, and implementation environments involved in the embodiments of the present disclosure are briefly introduced.

First, a brief introduction to the technical terms in the present disclosure is made.

HARQ: This mechanism can use a Stop-and-Wait Protocol (also known as the SQW protocol) to send data. In the Stop-and-Wait Protocol, after the sender uses a HARQ process to send a Transmission Block (TB), the sender stops and waits for feedback information, and this procedure may also be referred to as a HARQ procedure. In this way, the sender will stop and wait for confirmation after sending the TB. However, the above method may easily lead to low user throughput. Therefore, in order to improve user throughput, multiple parallel HARQ processes can be used for TB transmission. When one HARQ process is waiting for feedback information, the sender can use another HARQ process to continue to send a TB. These HARQ processes together form a HARQ entity. Each HARQ entity is responsible for maintaining a set of parallel downlink HARQ processes and a set of parallel uplink HARQ processes. The HARQ entity combines the Stop-and-Wait Protocol to allow data blocks to be sent continuously. In a HARQ process, the feedback information includes positive acknowledgment (ACK) information or negative acknowledgment (NACK) information. If the confirmation reception is successful, the feedback information is ACK, and if the confirmation reception fails, the feedback information is NACK. A feedback sequence including ACK information or NACK information may be referred to as a HARQ-ACK codebook.

HARQ-ACK codebook feedback: This refers to the HARQ-ACK codebook feedback in the type-3 HARQ feedback mode, also known as Type-3 HARQ-ACK codebook feedback, which can be configured by a network device for a terminal device. If the network device configures the Type-3 HARQ-ACK codebook feedback for the terminal device, the network device can trigger the terminal device to perform one-shot HARQ-ACK codebook feedback through Downlink Control Information (DCI). For example, a valid Physical Uplink Control Channel (PUCCH) resource may be indicated for the one-shot HARQ-ACK codebook. The one-shot HARQ-ACK codebook includes feedback information corresponding to all HARQ processes on all configured cells in a PUCCH group, where the feedback information includes ACK information or NACK information. The feedback information corresponding to a HARQ process including a downlink transmission is a decoding result of the downlink transmission, and the feedback information corresponding to a HARQ process not including a downlink transmission is a preset value or an initial value.

For uplink transmission, if one-shot HARQ-ACK codebook feedback is configured, the network device may send the feedback information corresponding to all HARQ processes on the cell to the terminal device through DCI. The feedback information corresponding to a HARQ process including a uplink transmission is a decoding result of the uplink transmission, and the feedback information corresponding to a HARQ process not including a uplink transmission is a preset value or an initial value. The uplink transmission includes uplink transmission scheduled by DCI and uplink transmission scheduled by CG (Configured Grant).

In HARQ-ACK codebook feedback, for a cell configured with Code Block Group (CBG) transmission, the network device may use Radio Resource Control (RRC) signaling to indicate whether the terminal device needs to perform feedback for CBG. If the terminal device is configured with the CBG-based feedback mode on a certain cell, the terminal device needs to perform the CBG-based feedback when performing the HARQ-ACK codebook feedback on the cell. Optionally, the terminal device may not perform TB-based feedback on the cell, or may perform TB-based feedback on the carrier.

In addition, the one-shot HARQ-ACK codebook feedback may include two types: one is the one-shot HARQ-ACK codebook feedback carrying New Data Indication (NDI) information, and the other is the one-shot HARQ-ACK codebook feedback that does not carry NDI information. The NDI information may be used to determine whether the corresponding data is retransmitted data or new data. Usually, when the data is new data, the current NDI information is toggled relative to the NDI information transmitted last time, and accordingly, based on whether the NDI information is toggled, whether the data is new data or retransmitted data can be determined. For example, if the NDI information transmitted last time is "1", and if the current NDI information is "0", it can be determined that the NDI information has been toggled at this time, and accordingly it can be determined that the current data packet is a new data packet. As an example, the network device may configure whether the terminal device needs to carry NDI information when performing HARQ-ACK codebook feedback through RRC signaling.

CBG: in general, a TB includes multiple CBGs. In the TB-based transmission process, if at least one CBG in a TB is transmitted in error, when a HARQ process is used to retransmit data, the entire TB needs to be retransmitted, which results in a waste of resources. To this end, a CBG-based transmission method is currently proposed, that is, if at least one CBG in a TB is transmitted in error, when retransmitting data through the HARQ process, only the at least one CBG in error can be retransmitted, rather than transmitting the entire TB.

HARQ codebook: also known as HARQ-ACK codebook. The entirety of feedback information fed back by a terminal device on one HARQ feedback resource is called a HARQ codebook. In the one-shot HARQ-ACK codebook feedback, the HARQ codebook includes feedback information corresponding to all HARQ processes of all cells in a PUCCH group (or a cell group).

Generally, the arrangement order of HARQ codebook follows the following principles:

(1) For one-shot HARQ feedback carrying NDI information, for each TB, the HARQ-ACK information is first arranged, and then the NDI information is arranged.

(2) For carriers without CBG feedback configured:

First, feedback information for TBs within each HARQ process is ordered, and then the feedback information of different HARQ processes is ordered (or, for the HARQ processes ordered in ascending order of carriers, the feedback information bit for each TB of each HARQ process is fed back).

(3) For carriers configured with CBG feedback, the ordering may include at least one of the following methods:

Method 1: first, the feedback information for each TB within each HARQ process is ordered. The feedback information for the TB is determined by CBG feedback. Then, feedback information of different HARQ processes is ordered (or, for HARQ processes ordered in ascending order of carriers, the CBG-based feedback information bit corresponding to each TB of each HARQ process is fed back).

Method 2-1: first, feedback information for TBs within each HARQ process is ordered, the feedback information for each TB is ordered in the order of the CBG feedback method and then the TB feedback method, and then the feedback information of different HARQ processes is ordered (or, for each TB of each HARQ process among HARQ processes ordered in ascending order of carriers, the CBG-based feedback information bit is fed back first, and then the TB-based feedback information bit is fed back).

Method 2-2: first, feedback information within each HARQ process is ordered, the feedback information for process is ordered in the order of the CBG feedback method for each TB first and then the TB feedback method for each TB, and then the feedback information of different HARQ processes is ordered (or, for each TB of each HARQ process among HARQ processes ordered in ascending order of carriers, the CBG-based feedback information bit for each TB is fed back first, and then the TB-based feedback information bit for each TB is fed back).

Semi-Persistent Scheduling Physical Downlink Shared Channel (SPS PDSCH)

In order to support periodic services with basically fixed traffic and reduce frequent Physical Downlink Control Channel (PDCCH) scheduling overhead, the NR system may support semi-static resource configuration. The semi-static resource configuration refers to that the network device configures resources semi-statically for a terminal device through higher layer signaling such as RRC signaling, and when there is a service requirement, the network device activates the semi-static resource configuration for the terminal device through the DCI carried by the PDCCH, so that the terminal device may receive service data according to the configured resources in each fixed period.

In other words, the terminal device may be configured with SPS configuration resources, and the network device may indicate whether the terminal device performs SPS PDSCH transmissions on the SPS configuration resources by means of activation or deactivation. The SPS configuration resources may be configured on the SpCell or on the SCells. In R15, the network device needs to ensure that at most one cell in a cell group is configured with downlink SPS configuration resources. With the evolution of the release, multiple downlink SPS configuration resources can be configured in one cell group.

The downlink SPS configuration resources are mainly activated and deactivated through DCI scrambled by a Configured Scheduling-Radio Network Temporary Identity (CS-RNTI). As an example, if the terminal device receives the DCI scrambled by CS-RNTI, and the NDI field corresponding to the enabled TB is set to "0", then according to Table 1 (special fields settings for downlink SPS scheduling activation PDCCH) and Table 2 (special field settings for downlink SPS scheduling release PDCCH), the terminal device may determine whether a downlink SPS scheduling activation command or deactivation command (or a release command) is received. If the terminal device receives an SPS PDSCH deactivated DCI, the terminal device is expected to perform corresponding HARQ-ACK feedback after N symbols from the last symbol of a PDCCH corresponding to the SPS PDSCH deactivated DCI. The value of N can be a preset value, and the preset value may be set based on requirements.

TABLE 1

|  | DCI format 1_0 | DCI format 1_1 |
| --- | --- | --- |
| HARQ process number | set to all '0's | set to all '0's |
| Redundancy Version | set to '00' | For the enabled transport block: set to '00' |

TABLE 2

|  | DCI format 1_0 |
| --- | --- |
| HARQ process number | set to all '0's |
| Redundancy Version | set to '00' |
| Modulation and coding scheme | set to all '1's |
| resource block assignment | set to all '1's |

If downlink SPS transmission is configured and activated for the terminal device, the terminal device receives the SPS PDSCH sent by the network device on the downlink SPS configuration resource. The SPS PDSCH is periodically transmitted on the downlink SPS configuration resource, and the SPS PDSCH does not correspond to PDCCH scheduling.

Since there is no PDCCH scheduling, the SPS PDSCH transmitted on the downlink SPS configuration resource only includes the initial transmission. If the initial transmission for a HARQ process fails, retransmission is needed, the network device will schedule the same HARQ process through the DCI scrambled by CS-RNTI, and set the NDI field to "1"; in other words, if the DCI scrambled by the CS-RNTI is received by the terminal device and the NDI field is set to "1", the terminal device will consider the HARQ process scheduled by the DCI as a retransmission.

Configured Grant Physical Uplink Shared Channel (CG-PUSCH)

In order to support periodic services with basically fixed traffic and reduce frequent Physical Downlink Control Channel (PDCCH) scheduling overhead, the NR system may support semi-static uplink resource configuration. The semi-static resource configuration refers to that the network device configures resources semi-statically for a terminal device through higher layer signaling such as RRC signaling. In the NR system, configured grant uplink transmission without dynamic grant scheduling can be performed through CG resources semi-statically configured by higher layer signaling. There are two specific implementation solutions, that is, the actual uplink grant can be obtained through RRC configuration (type 1) or through CS-RNTI scrambled PDCCH (type 2). When the terminal device has service requirements, the terminal device can send service data through the activated (or granted) semi-static resource configuration. The activation and deactivation methods of Type 2 CG-PUSCH resources are similar to the activation and deactivation methods of SPS PDSCH resources.

CBG-based transmission: in the NR system, for a certain serving cell, if the terminal device is configured with CBG-based transmission, a TB in PDSCH scheduled by non-fallback mode format DCI (such as DCI format 1_1) received by the terminal device includes at least one CBG. If the terminal device receives a PDSCH scheduled by DCI in a fallback mode format (such as DCI format 1_0), or, if the terminal device receives a semi-persistent scheduling SPS PDSCH, the PDSCH includes one TB, that is, the PDSCH transmission is based on the TB, rather than CBG.

Next, the application scenarios involved in the present disclosure are briefly introduced.

In the NR system or an evolved system of the NR system (such as the NR-U system), the network device may configure the CBG-based transmission mode and/or feedback mode for the terminal device. When the terminal device is configured with Type-3 HARQ-ACK codebook feedback and is configured with a CBG-based feedback method, how to determine the Type-3 HARQ-ACK codebook to be fed back becomes a current research focus. To this end, embodiments of the present disclosure provide a method for determining a HARQ-ACK codebook, and the specific implementations can refer to the following embodiments.

In addition, the implementation environments involved in the embodiments of the present disclosure are briefly introduced.

The technical solutions of embodiments of the present disclosure can be applied to various communication systems, such as: Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (LTE FDD) system, LTE Time Division Duplex (LTE TDD) system, Advanced long term evolution (LTE-A) system, New Radio (NR) system, evolution system of NR system, LTE-Based Access To Unlicensed Spectrum (LTE-U) system, NR-U system, Universal Mobile Telecommunication System (UMTS), Worldwide Interoperability for Microwave Access (WiMAX) communication system, Wireless Local Area Network (WLAN), Wireless Fidelity (WiFi), next-generation communication systems or other communication systems, etc.

Generally speaking, traditional communication systems support a limited number of connections and are easy to implement. However, with the development of communication technologies, mobile communication systems will not only support traditional communications, but also support, for example, Device to Device (D2D) communication, Machine to Machine (M2M) communication, Machine Type Communication (MTC), Vehicle to Vehicle (V2V) communication and Vehicle to Everything (V2X, Internet of Vehicles) systems, etc., and the embodiments of the present disclosure can also be applied to these communication systems.

The system architecture and service scenarios described in the embodiments of the present disclosure are for the purpose of illustrating the technical solutions of the embodiments of the present disclosure more clearly, and should not be construed as constituting limitations on the technical solutions provided by the embodiments of the present disclosure. One of ordinary skill in this art will understand that, with the evolution of the architecture and the emergence of new service scenarios, the technical solutions provided in the embodiments of the present disclosure are also applicable to similar technical problems.

Exemplarily, a communication system 100 to which embodiments of the present disclosure is applied is shown in FIG. 1. The communication system 100 may include a network device 110. The network device 110 may be a device that communicates with a terminal device 120 (or referred to as a communication terminal, a terminal). The network device 110 may provide communication coverage for a particular geographic area, and may communicate with terminals within the coverage area. Optionally, the network device 110 may be an evolved base station (Evolutional Node B, eNB or eNodeB) in an LTE system, or a wireless controller in a Cloud Radio Access Network (CRAN). Or, the network device may be a mobile switching center, a relay station, an access point, an in-vehicle device, a wearable device, a hub, a switch, a network bridge, a router, a network-side device in 5G networks, or a network device in a future evolved communication system, etc.

The communication system 100 also includes at least one terminal device 120 within the coverage of the network device 110. The "terminal" herein may be connected in the following manners (including but not limited to):

The terminal may be connected via wired lines, such as via Public Switched Telephone Networks (PSTN), Digital Subscriber Line (DSL), digital cables, or direct cable connections; and/or the terminal may be connected via another data connection/network; and/or the terminal may be connected via a wireless interface, such as cellular networks, wireless local area network (WLAN), digital TV networks such as DVB-H networks, satellite networks, AM-FM broadcast transmitter; and/or the terminal is connected via a device of another terminal which is configured to receive/send communication signals; and/or the terminal is connected via an Internet of Things (IoT) device. A terminal set as communicating through a wireless interface may be referred to as a "wireless communication terminal", a "wireless terminal" or a "mobile terminal". Examples of the mobile terminal include but are not limited to: satellite or cellular phone; Personal Communications System (PCS) terminal that can integrate a cellular radio phone with data processing, fax, and data communication capabilities; a PDA which can include a radio phone, a pager, an Internet/intranet access, a Web browser, a memo pad, a calendar, and/or Global Positioning System (GPS) receiver; and conventional laptop and/or palmtop receivers or other electronic device including a radio telephone transceiver. The terminal device can refer to access terminal, UE, user unit, user station, mobile station, mobile device, remote station, remote terminal, mobile equipment, user terminal, terminal, wireless communication equipment, user agent or user device. The access terminal can be a cellular phone, a cordless phone, a Session Initiation Protocol (SIP) phone, a Wireless Local Loop (WLL) station, a Personal Digital Assistant (PDA), a handheld device with wireless communication functions, a computing device or other processing device connected to a wireless modem, an in-vehicle device, a wearable device, a terminal in 5G networks, or a terminal in a future evolved PLMN, etc.

According to some embodiments, the terminal devices 120 may perform Device to Device communications between each other.

According to some embodiments, the 5G communication or 5G network may also be referred to as NR system or NR network.

FIG. 1 exemplarily shows one network device and two terminals. According to some other embodiments, the communication system 100 may include multiple network devices, and the coverage of each network device may include other numbers of terminals, and embodiments of the present disclosure do not impose specific limitations on this.

According to some embodiments, the communication system 100 may further include other network entities such as a network controller or a mobility management entity, and embodiments of the present disclosure do not impose specific limitations on this.

It should be understood that, in the embodiments of the present disclosure, a device having a communication function in the network/system may be referred to as a communication device. Taking the communication system 100 shown in FIG. 1 as an example, the communication device may include a network device 110 and a terminal devices 120 which have a communication function, and the network device 110 and the terminal device 120 may be the specific devices described above, which will not be repeated. The communication device may also include other devices in the communication system 100, for example, other network entities such as a network controller, a mobility management entity, etc., and embodiments of the present disclosure do not impose specific limitations on this.

FIG. 2 is a flowchart of a HARQ-ACK codebook determination method according to an example embodiment. The method can be applied to the above implementation environments, and the method includes at least part of the following contents:

In step 201, first feedback information is generated. The first feedback information includes feedback information for a first physical channel, the first physical channel is a physical channel corresponding to a first HARQ process on a first cell, the first cell supports a CBG-based feedback mode, and the first physical channel does not correspond to a CBG-based transmission mode.

The feedback information for the first physical channel includes at least HARQ feedback information, for example, the HARQ feedback information includes ACK information or NACK information.

According to some example embodiments of the present disclosure, the method is performed by a terminal device, and generating the first feedback information may be that the terminal device generates the first feedback information for downlink transmission.

According to some example embodiments of the present disclosure, the method is performed by a terminal device, and generating the first feedback information may be that the terminal device generates the first feedback information for sideline transmission. The sideline transmission may include transmissions between terminal devices, such as V2X.

According to some example embodiments of the present disclosure, the method is performed by a network device, and generating the first feedback information may be that the network device generates the first feedback information for uplink transmission.

According to some example embodiments, the first cell may be a cell among N cells, and there may be one or more first cells. In addition, one cell corresponds to one carrier.

According to some example embodiments, the N cells are all cells included in a PUCCH group or a cell group, or the N cells are activated cells among all cells included in a PUCCH group or a cell group.

In other words, the N may be the number of cells configured by the network device, or may also be the number of cells activated by the network device, which is not limited in embodiment of the present disclosure.

Generally, a serving cell may belong to a PUCCH group or a cell group. In order to realize data transmission, the network device may configure cells for a PUCCH group or a cell group, and all or part of all the configured cells are activated. In some embodiments of the present disclosure, the N cells may include all cells configured for a PUCCH group or a cell group, and of course, the N cells may only include activated cells in the PUCCH group or the cell group, and embodiments of the present disclosure do not impose specific limitations on this.

According to some example embodiments, the number of HARQ processes included in a cell may be configured by the network device, or, if not configured by the network device, the number of HARQ processes included in a cell may be a default value, for example, the default value is 8.

As an example, the number of HARQ processes included in the first cell may be one or multiple, which is not limited in embodiments of the present disclosure.

The first cell may be configured to support a CBG-based feedback mode. According to some example embodiments, the first cell supporting the CBG-based feedback mode may include two cases: the first cell is configured as the CBG-based feedback mode, or the PUCCH group or cell group to which the first cell belongs is configured as the CBG-based feedback mode.

As an example, when configuring the CBG feedback mode, the network device may configure the feedback mode in a unit of a single cell, that is, the network device may indicate which cells are configured to perform feedback based on CBG, for example, the first cell is configured to use the CBG-based feedback mode. Alternatively, the network device may also configure the feedback mode by taking a PUCCH group or a cell group as a unit, that is, cells in the entire PUCCH group or cell group are configured to use the CBG-based feedback mode.

It can be seen that the first cell may be configured to support the CBG-based feedback mode, however, in some embodiments, the first physical channel corresponding to the first cell may not correspond to the CBG-based transmission mode. According to some example embodiments, the first physical channel not corresponding to the CBG-based transmission mode includes at least one of the following situations:

(1) The first physical channel is a physical channel scheduled by a first DCI, and the first DCI is a DCI in a fallback mode format.

As an example, the DCI of the fallback mode format may be a DCI of the DCI format 1_0. For example, the first physical channel includes a PDSCH scheduled by DCI format 1_0. For another example, the first DCI is used to activate a semi-persistent scheduling physical channel, and the first physical channel includes SPS PDSCH transmission scheduled (or activated) by the first DCI.

The PDSCH scheduled by the first DCI performs data transmission based on TB, that is, data transmission is not based on CBG. Therefore, if the first physical channel is the physical channel scheduled by the first DCI, it can be considered that the first physical channel does not correspond to the CBG-based transmission mode.

As an example, the DCI of the fallback mode format may be a DCI of the DCI format 0_0. For example, the first physical channel includes a PUSCH scheduled by DCI format 0_0. For another example, the first DCI is used to activate a semi-persistent scheduling physical channel, and the first physical channel includes SPS PUSCH transmission scheduled (or activated) by the first DCI.

The PUSCH scheduled by the first DCI performs data transmission based on TB, that is, data transmission is not based on CBG. Therefore, if the first physical channel is a physical channel scheduled by the first DCI, it can be considered that the first physical channel does not correspond to the CBG-based transmission mode.

(2) The first physical channel is a semi-persistent scheduling physical channel.

As an example, the first physical channel is a PDSCH without DCI scheduling, or the first physical channel includes an SPS PDSCH. The PDSCH performs data transmission based on TB, that is, data transmission is not based on CBG. Therefore, if the first physical channel is a semi-persistent scheduling physical channel, it can be considered that the first physical channel does not correspond to the CBG-based transmission mode.

As an example, the first physical channel is a PUSCH without DCI scheduling, or the first physical channel includes a CG-PUSCH. The PUSCH is a PUSCH for data transmission based on TB, that is, data transmission is not based on CBG. Therefore, if the first physical channel is a semi-persistent scheduling physical channel, it can be considered that the first physical channel does not correspond to the CBG-based transmission mode.

(3) The first physical channel is a first PDCCH, and the first PDCCH is used to indicate release of a semi-persistent scheduling physical channel, or the first PDCCH is used to indicate activation of a semi-persistent scheduling physical channel.

As an example, the first PDCCH used to indicate the release of the semi-persistent scheduling physical channel does not schedule data transmission, and thus it can be considered that the first PDCCH is not transmitted based on CBG. Accordingly, if the first physical channel is the first PDCCH, it can be considered that the first physical channel does not correspond to the CBG-based transmission mode. According to some example embodiments, the first PDCCH may be used to indicate SPS PDSCH release. According to some example embodiments, the first PDCCH may be used to indicate SPS PUSCH release.

As an example, for the first PDCCH used to indicate the activation of the semi-persistent scheduling physical channel, if the first PDCCH corresponds to the feedback information, it may be considered that the first PDCCH does not correspond to the CBG-based transmission mode.

(4) The first cell does not support the CBG-based transmission mode.

In some cases, the network device may configure the first cell not to support the CBG-based transmission mode, or, if the first cell is not configured to support the CBG-based transmission mode, the first cell supports the TB-based transmission mode. For example, the first cell may only support the TB-based transmission mode. In this case, the first physical channel corresponding to the first cell performs data transmission based on TB, that is, does not perform data transmission based on CBG. Therefore, if the first cell does not support the CBG-based transmission mode, it may be determined that the first physical channel corresponding to the first cell does not correspond to the CBG-based transmission mode.

As an example, the first cell not supporting the CBG-based transmission mode includes: none of the PDSCH transmissions on the first cell corresponds to the CBG-based transmission mode, for example, the first physical channel may also include a PDSCH scheduled by DCI format 1_1.

As an example, the first cell not supporting the CBG-based transmission mode includes: none of the PUSCH transmissions on the first cell corresponds to the CBG-based transmission mode, for example, the first physical channel may also include a PUSCH scheduled by DCI format 0_1.

As an example, for the first physical channel, the CBG-based transmission mode is not used for data transmission. In this case, it is needed to determine the codebook of the feedback information corresponding to the first physical channel, that is, to determine the first feedback information. It is not difficult to understand that the first feedback information is part or all of the HARQ-ACK codebook to be fed back.

According to some example embodiments, the number of information bits included in the first feedback information is determined according to the CBG feedback length G and/or the TB feedback length T. The CBG feedback length G is the CBG feedback length corresponding to one TB, and the TB feedback length T is the TB feedback length on the first cell, G is a positive integer, and the T is a positive integer.

G is used to identify the CBG feedback length, and T is used to identify the TB feedback length.

As an example, the CBG feedback length may refer to the number of feedback bits of HARQ-ACK information corresponding to each TB of the first cell.

According to some example embodiments, the CBG feedback length G may be determined according to a first configuration parameter of the network device, for example, the first configuration parameter is maxCodeBlockGroupsPerTransportBlock. According to some example embodiments, the CBG feedback length G may be determined according to the maximum number of CBGs that each TB can include.

According to some example embodiments, the CBG feedback length G is determined according to one of the following methods:

First method: when the first cell supports the CBG-based transmission mode, or the first cell is configured with the CBG-based transmission mode, the CBG feedback length G is the CBG feedback length on the first cell.

As an example, for a certain serving cell (such as the first cell), if the terminal device is configured with the CBG-based transmission, the network device may provide the terminal device with a first configuration parameter for indicating the maximum number of CBGs (that is, the CBG feedback length G) included in one TB transmitted in the serving cell (such as the first cell). For example, the first configuration parameter is maxCodeBlockGroupsPerTransportBlock, so that the terminal device can generate corresponding CBG-based HARQ-ACK information bits based on the maximum number of CBGs. Therefore, when the first cell supports the CBG-based transmission mode, the CBG feedback length G may be determined according to the CBG feedback length on the first cell, for example, according to the first configuration parameter on the first cell.

Second Method: when the first cell does not support the CBG-based transmission mode and a second cell in the N cells supports the CBG-based transmission mode, the CBG feedback length G is the GBG feedback length on the second cell.

As an example, if the first cell does not support the CBG-based transmission mode, but the second cell that belongs to the same group as the first cell supports the CBG-based transmission mode, then the terminal device can determine the CBG feedback length G according to the CBG feedback length on the second cell. It is not difficult to understand that the CBG feedback length on the second cell can be determined according to the parameter maxCodeBlockGroupsPerTransportBlock on the second cell.

According to some example embodiments, the second cell is a cell with a longest CBG feedback length among cells supporting the CBG-based transmission mode among the N cells; or, the second cell is a cell with a shortest CBG feedback length among cells supporting the CBG-based transmission mode among the N cells.

As an example, the TB feedback length may refer to the number of feedback bits of the HARQ-ACK information which is based on TB feedback and corresponds to each HARQ process of the first cell.

According to some example embodiments, the TB feedback length T may be determined according to a second configuration parameter of the network device. Exemplarily, the TB feedback length T may refer to the maximum number of TBs of the first cell, or the TB feedback length T may be smaller than the maximum number of TBs of the first cell.

For example, if the terminal device is not configured with spatial division multiplexing feedback (for example, the network device does not provide harq-ACK-SpatialBundlingPUCCH or harq-ACK-SpatialBundlingPUSCH parameters), the TB feedback length T refers to the maximum number of TBs in the cell, that is, the number of HARQ-ACK information bits based on TB feedback corresponding to one HARQ process is T. If the terminal device is configured with the spatial division multiplexing feedback, in this case, two HARQ-ACK information bits corresponding to two TBs can be spatial division multiplexed into one HARQ-ACK information bit. Therefore, the TB feedback length is 1, that is, the number of HARQ-ACK information bits based on TB feedback corresponding to one HARQ process is 1.

As an example, the second configuration parameter may be the parameter maxNrofCodeWordsScheduledByDCI. For example, for a certain serving cell, the network device may provide the terminal device with a second configuration parameter used to indicate the maximum number of TBs (or the maximum number of codewords) that can be scheduled by DCI, namely maxNrofCodeWordsScheduledByDCI. The second configuration parameter is used to determine the TB feedback length T.

In addition, the corresponding TB feedback lengths T in different cells may be different or the same, which is not limited in the present disclosure.

According to some example embodiments, the number of information bits included in the first feedback information is determined according to the CBG feedback length G, or the number of information bits included in the first feedback information is determined according to the TB feedback length T, or the number of information bits included in the first feedback information is determined according to the CBG feedback length G and the TB feedback length T.

According to some example embodiments, the 1-bit HARQ-ACK information included in the first physical channel corresponds to G information bits in a sub-codebook included in the first feedback information, and the G information bits include one of the following cases:

In a first case: the first information bit in the G information bits is the 1-bit HARQ-ACK information, and/or other information bits in the G information bits except the first information bit are NACK.

As an example, if the first physical channel corresponds to 1-bit HARQ-ACK information, the 1-bit HARQ-ACK information is taken as the first information bit in the G information bits in one sub-codebook, and the remaining (G-1) information bits in the sub-codebook may be padded with NACKs. For example, assuming that the value of G is 4, a sub-codebook included in the first feedback information is shown in FIG. 3, where NACK0/ACK0 indicates that the first physical channel corresponds to 1-bit HARQ-ACK information.

According to some example embodiments of the present disclosure, the first physical channel corresponds to 1-bit HARQ-ACK information, which may refer to: the 1-bit HARQ-ACK information may be ACK information or NACK information corresponding to the first physical channel. For example, the first physical channel is used to transmit a TB, and the 1-bit HARQ-ACK information is a decoding result of the TB transmitted on the first physical channel.

In a second case: the G information bits are G repetitions of the 1-bit HARQ-ACK information.

As an example, if the first physical channel corresponds to 1-bit HARQ-ACK information, the G information bits in a sub-codebook are all the 1-bit HARQ-ACK information. For example, assuming that the value of G is 4, a sub-codebook included in the first feedback information is shown in FIG. 4.

According to some example embodiments, if the network device configures a feedback mode including NDI information, the 1-bit HARQ-ACK information also corresponds to 1-bit NDI information, the sub-codebook further includes 1-bit NDI information, and the 1-bit in the sub-codebook NDI information is appended after the G information bits.

According to some example embodiments of the present disclosure, the 1-bit HARQ-ACK information corresponds to 1-bit NDI information, which may refer to: 1-bit NDI information corresponding to 1-bit HARQ-ACK information for the first physical channel. For example, the first physical channel is used to transmit a TB, the 1-bit HARQ-ACK information is the decoding result of the TB transmitted on the first physical channel, and the 1-bit NDI information is NDI information corresponding to the TB transmitted on the first physical channel.

As an example, if the network device configures a feedback mode including NDI information, the terminal device needs to feed back NDI information when the HARQ-ACK codebook is fed back. In this case, if the 1-bit HARQ-ACK information corresponds to 1-bit NDI information, the 1-bit NDI information can be appended after the G information bits.

As an example, if the network device configures a feedback mode including NDI information, and the network device configures spatial division multiplexing feedback, the terminal device needs to feed back NDI information when the HARQ-ACK codebook is fed back. In this case, the 1-bit HARQ-ACK information corresponds to 2-bit NDI information (for example, the 2-bit NDI information is NDI information corresponding to two TBs respectively), and the 2-bit NDI information may be attached after the G information bits.

According to some example embodiments, the sub-codebook corresponding to the 1-bit HARQ-ACK information may further include other information, which is not limited in the present disclosure. As an example, the sub-codebook corresponding to the 1-bit HARQ-ACK information may further include HARQ-ACK information based on TB feedback. For example, one sub-codebook includes {G HARQ-ACK information bits based on CBG, T HARQ-ACK information bits based on TB}. For another example, if the feedback mode including NDI information is configured, one sub-codebook includes {G HARQ-ACK information bits based on CBG, T HARQ-ACK information bits based on TB, 1-bit NDI information}.

According to some example embodiments, according to different values of T, the determined first feedback information is also different. Specifically, the first feedback information may include one of the following cases:

Case 1: T=1, the first feedback information includes 1 sub-codebook, the first physical channel includes 1-bit HARQ-ACK information, and the sub-codebook included in the first feedback information is the sub-codebook corresponding to the 1-bit HARQ-ACK information.

That is, when the first feedback information includes 1 sub-codebook, the sub-codebook corresponding to the 1-bit HARQ-ACK information determined in the above manner may be used as the first feedback information.

Case 2: T=2, the first feedback information includes 2 sub-codebooks, the first physical channel includes 1-bit HARQ-ACK information, and the first sub-codebook included in the first feedback information is the sub-codebook corresponding to the 1-bit HARQ-ACK information.

That is, if the first feedback information includes 2 sub-codebooks, but the first physical channel only includes 1-bit HARQ-ACK information, then the terminal device can use the sub-codebook corresponding to the 1-bit HARQ-ACK information determined in the above manner as the first sub-codebook included in the first feedback information.

According to some example embodiments, the second sub-codebook included in the first feedback information is appended after the first sub-codebook included in the first feedback information.

According to some example embodiments, T=2, the first feedback information includes 2 sub-codebooks, the first physical channel includes 1-bit HARQ-ACK information, and the second sub-codebook included in the first feedback information is one of the following cases (I)-(II):

(I) The second sub-codebook includes G information bits, and the G information bits in the second sub-codebook are NACK.

That is to say, the G information bits included in the two sub-codebooks can be padded with NACK, for example, as shown in FIG. 5 or FIG. 6.

Optionally, in this case, regardless of whether a feedback mode including NDI information is configured, the second sub-codebook may be determined in this manner.

(II) The second sub-codebook includes G+1 information bits, the first G information bits in the second sub-codebook are NACK, and the last information bit in the second sub-codebook is a preset value.

The preset value may be preset in a standard, or configured by the network device through higher layer parameters, or set according to actual requirements.

Figure 8:
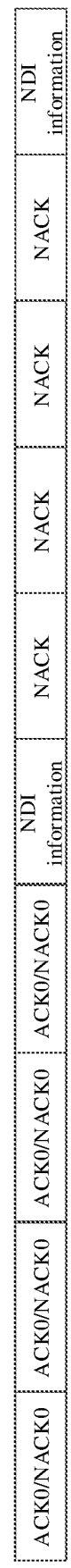
FIG. 8 is a schematic diagram of a HARQ-ACK codebook according to another example embodiment of the present disclosure.

As an example, if the network device configures the feedback mode including NDI information, the second sub-codebook includes G+1 information bits, and the first G information bits among the G+1 information bits in the second sub-codebook can be padded with NACK, and the last information bit in the G+1 information bits in the second sub-codebook is the preset value, for example, as shown in FIG. 7 or FIG. 8.

Case 3: T=2, the first feedback information includes 2 sub-codebooks, the first physical channel includes 2-bit HARQ-ACK information, the first sub-codebook included in the first feedback information is a sub-codebook corresponding to the first bit HARQ-ACK information in the 2-bit HARQ-ACK information, and the second sub-codebook included in the first feedback information is a sub-codebook corresponding to the second bit HARQ-ACK information in the 2-bit HARQ-ACK information.

As an example, the generation method of the sub-codebook corresponding to the second bit HARQ-ACK information in the 2-bit HARQ-ACK information is the same as the generation method of the subcode corresponding to the first bit HARQ-ACK information in the 2-bit HARQ-ACK information.

For example, the generation of the sub-codebook corresponding to the second bit HARQ-ACK information in the 2-bit HARQ-ACK information includes: the sub-codebook includes G information bits, the first information bit in the G information bits is the second bit HARQ-ACK information in the 2-bit HARQ-ACK information, and/or other information bits except the first information bit in the G information bits are NACK. For another example, the sub-codebook includes G information bits, and the G information bits are the second bit HARQ-ACK information in the 2-bit HARQ-ACK information. For example, as shown in FIG. 9 or FIG. 10, NACK1/ACK1 represents the second bit HARQ-ACK information in the 2-bit HARQ-ACK information.

According to some example embodiments, if the first feedback information includes two sub-codebooks, the second sub-codebook included in the first feedback information is appended after the first sub-codebook included in the first feedback information.

According to some example embodiments, if the first cell does not support the CBG-based transmission mode, the first feedback information includes at least T information bits, and the first feedback information includes one of the following cases (5) and (6):

(5) The first physical channel corresponds to 1-bit HARQ-ACK information, the first information bit in the T information bits is 1-bit HARQ-ACK information corresponding to the first physical channel, and/or other information bits except the first information bit in the T information bits are NACK.

As an example, if the first cell does not support the CBG-based transmission mode, and the first feedback information includes at least T information bits, in the procedure of HARQ-ACK information feedback, feedback may be performed based on TB. In this case, if the first physical channel corresponds to 1-bit HARQ-ACK information, the 1-bit HARQ-ACK information can be used as the first information bit in the T information bits. If T is greater than 1, other information bits may be padded with NACK, for example, the codebook of the first feedback information may be as shown in FIG. 11.

(6) The first physical channel corresponds to 2-bit HARQ-ACK information, T=2, and the first information bit in the T information bits is the first bit HARQ-ACK information in the 2-bit HARQ-ACK information corresponding to the first physical channel, and/or, the second information bit in the T information bits is the second bit HARQ-ACK information in the 2-bit HARQ-ACK information corresponding to the first physical channel.

As an example, if the first physical channel corresponds to 2-bit HARQ-ACK information, the first bit HARQ-ACK information in the 2-bit HARQ-ACK information may be used as the first information bit in the T information bits, and the second bit HARQ-ACK information in the 2-bit HARQ-ACK information may be used as the second information bit in the T information bits, so as to obtain the first feedback information. For example, the HARQ-ACK information bits included in the first feedback information may be as shown in FIG. 12.

According to some example embodiments, if the network device configures the feedback mode including NDI information, the first feedback information further includes NDI information for the first physical channel.

As an example, the NDI information may be arranged after the HARQ-ACK information corresponding to the first physical channel.

According to some example embodiments, the number of NDI information for the first physical channel included in the first feedback information is determined according to the maximum number of TBs on the first cell.

If the network device configures the spatial division multiplexing feedback, the HARQ-ACK information for two TBs is multiplexed into 1-bit HARQ-ACK information, but in this case, the NDI information for the two TBs still needs to be fed back independently. Therefore, the number of NDI information for the first physical channel is determined according to the maximum number of TBs on the first cell.

According to some example embodiments, the first physical channel is a semi-persistent scheduling physical channel, and the NDI information is a preset value.

As an example, if the network device configures the feedback mode including NDI information, it means that the terminal device needs to feed NDI information back. If the first physical channel is a semi-persistent scheduling physical channel, the NDI information can be a preset value, that is, the preset value can be preset according to actual requirements. For example, if the HARQ process is used for semi-persistent scheduling transmission, the transmitted data can be considered as new data.

For example, if the first HARQ process is used to transmit the SPS PDSCH on the downlink SPS configuration resource, the value of the NDI information included in the first feedback information is "0"; or, if the first HARQ is used for retransmission of the SPS PDSCH scheduled by DCI which is scrambled by CS-RNTI, the value of the NDI information included in the first feedback information is "1".

For another example, the value of the NDI information corresponding to the HARQ process for initial transmission of the SPS PDSCH is "0", or the value of the NDI information corresponding to HARQ process for retransmission of the SPS PDSCH is "1".

According to some example embodiments, if the first physical channel is CG-PUSCH, the NDI information is a preset value, for example, the value of the NDI information is 0 or 1; or, if the first physical channel is CG-PUSCH, the value of the NDI information is determined according to the NDI information carried by the CG-UCI (Uplink Control Information) transmitted in the CG-PUSCH.

According to some example embodiments of the present disclosure, the configuration parameter may be higher layer signaling.

According to some example embodiments of the present disclosure, higher layer signaling or higher layer parameters may include RRC information or Media Access Control Control Element (MAC CE).

In step 202, a target feedback sequence is determined. The target feedback sequence includes feedback information ordered based on HARQ process numbers in N cells, the N cells includes the first cell, the feedback information ordered based on HARQ process numbers in the N cells includes the first feedback information, and N is a positive integer.

The target feedback sequence includes the first feedback information determined above. In addition, the feedback information in the target feedback sequence is ordered based on HARQ process numbers, for example, may be ordered in ascending order of HARQ process numbers.

According to some example embodiments of the present disclosure, the method is performed by a terminal device, and the determination of the target feedback sequence may be that the terminal device determines the target feedback sequence for downlink transmission.

According to some example embodiments of the present disclosure, the method is performed by a terminal device, and the determination of the target feedback sequence may be that the terminal device determines the target feedback sequence for sideline transmission. The sideline transmission may include transmissions between terminal devices, such as V2X.

According to some example embodiments of the present disclosure, the method is performed by a network device, and the determination of the target feedback sequence may be that the network device determines the target feedback sequence for uplink transmission.

According to some example embodiments, the target feedback sequence includes feedback information for all HARQ processes on the N cells arranged based on HARQ process numbers, and the target feedback sequence is arranged in an order of HARQ process numbers first and then cells.

As an example, it is assumed that the target feedback sequence includes feedback information arranged based on HARQ process numbers on two cells. The first cell, such as cell 0, includes 16 HARQ processes, and the second cell, such as cell 1, includes 8 HARQ processes. In the codebook corresponding to the target feedback sequence, the feedback information is ordered as follows: first, the feedback information corresponding to the 16 HARQ processes on cell 0 is ordered, and then the feedback information corresponding to the 8 HARQ processes on cell 1 is ordered. Feedback. Assuming that the first cell is the above-mentioned second cell, namely cell 1, and the first HARQ process is HARQ process 5 in cell 1, the position of the first feedback information corresponding to the first HARQ process in the target feedback sequence is as shown in FIG. 13.

In embodiments of the present disclosure, first feedback information is generated. The first feedback information includes feedback information for a first physical channel, the first physical channel is a physical channel corresponding to a first HARQ process on a first cell, the first cell supports a CBG-based feedback mode, and the first physical channel does not correspond to a CBG-based transmission mode. A target feedback sequence is determined. The target feedback sequence includes feedback information ordered based on HARQ process numbers in N cells, the N cells includes the first cell, the feedback information ordered based on HARQ process numbers in the N cells includes the first feedback information, and N is a positive integer. In embodiments of the present disclosure, a method for determining a HARQ-ACK codebook is proposed when the first physical channel does not correspond to the CBG-based transmission mode, but the first cell supports the CBG-based feedback mode.

In embodiments of the present disclosure, the feedback information may include at least one of the following: ACK or NACK, NDI, Channel state information (CSI), Scheduling request (SR) information, Reference signal received power (RSRP) information, New feedback indicator (NFI) and so on.

It should be noted that the preset values involved in the embodiments of the present disclosure may be the same or different, which are not limited in the embodiments of the present disclosure.

In order to facilitate understanding, the following two examples are used to briefly introduce the above implementations:

Example One

If the terminal device uses the fallback mode DCI 1-0 to schedule the first PDSCH, the cell corresponding to the first PDSCH is configured with the CBG-based feedback mode, and the terminal device is configured with Type-3 codebook transmission, then when the terminal device is triggered to perform Type-3 codebook feedback and the Type-3 codebook includes feedback information corresponding to the first PDSCH, the terminal device generates first feedback information corresponding to the first PDSCH according to at least one of the following methods:

Assuming that the first feedback information only includes NACK information and/or ACK information, the terminal device may determine that the first feedback information corresponding to the first PDSCH includes T*G information bits;
    if the first PDSCH includes one TB, the terminal device generates a 1-bit HARQ-ACK information bit for the TB included in the first PDSCH.

Optionally, the terminal device generates a NACK for each information bit of the remaining (T*G−1) HARQ-ACK information bits in the HARQ-ACK codebook for the TB.

Optionally, if the first PDSCH includes two TBs, the terminal device repeats the 1-bit HARQ-ACK information bit G times to generate the first G information bits for the TB in the HARQ-ACK codebook, and generate NACK information bits for the last G information bits in the HARQ-ACK codebook for the TB.

As an example, if the first PDSCH includes two TBs, the terminal device generates 2-bit HARQ-ACK information bits for the TB included in the first PDSCH, and the terminal device generates a NACK for each of the remaining (T*G−2) HARQ-ACK information bits for the TB in the HARQ-ACK codebook.

Optionally, the specific implementation of the terminal device generating 2-bit HARQ-ACK information bits for the TB included in the first PDSCH may include that: the terminal takes the first bit of HARQ-ACK information as the first information bit of the G*T information bits, and take the second bit of HARQ-ACK information as the (G+1)-th information bit among the G*T information bits.

Optionally, the specific implementation of generating the 2-bit HARQ-ACK information bit by the terminal device for the TB included in the first PDSCH may further include that: the terminal device repeats the first bit of HARQ-ACK information in the 2 bits G times to generate the first G information bits in the HARQ-ACK codebook, and repeats the second bit of HARQ-ACK information in the 2 bits G times to generate the last G information bits in the HARQ-ACK codebook.

Example Two

Figure 14:
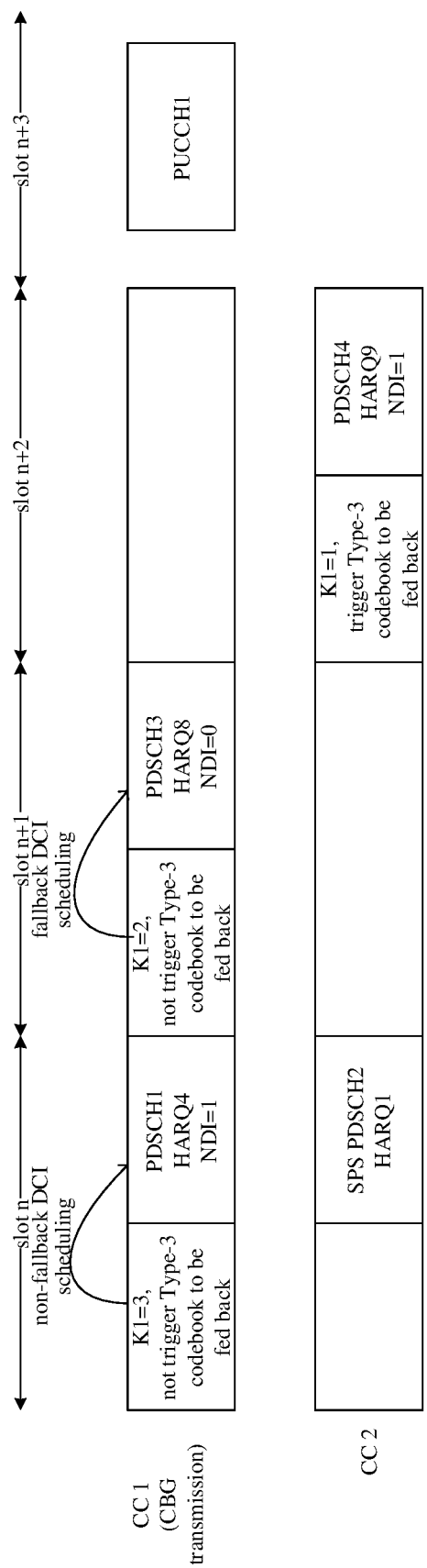
FIG. 14 is a schematic diagram of data transmission according to another example embodiment of the present disclosure.

Referring to FIG. 14, it is assumed that the terminal device is configured with two cells, namely CC1 and CC2, wherein the CBG-based transmission mode is configured on cell 1. On cell 1, the terminal device receives the PDSCH1 scheduled by the non-fallback mode format DCI (e.g., DCI format 1-1) on time slot n, and receives PDSCH3 scheduled by the fallback mode format DCI (e.g., DCI format 1-0) on time slot n+1. PDSCH3 is transmitted using a first HARQ process 1 (i.e., HARQ8). On cell 2, the terminal device receives the SPS PDSCH without PDCCH scheduling on time slot n and the corresponding HARQ process number is 1 (i.e., the first HARQ process 2), and receives PDSCH scheduled by the non-fallback mode format DCI (e.g., DCI format 1-1) on time slot n+2, and the DCI in the non-fallback mode format on slot n+2 simultaneously triggers one-shot HARQ feedback on slot n+3. The terminal device is configured with the CBG-based feedback method.

The terminal device generates a target feedback sequence. The target feedback sequence includes first feedback information 1 and first feedback information 2. The first feedback information 1 includes feedback information corresponding to the first HARQ process 1 (i.e., HARQ8 on CC1 in FIG. 14). The first feedback information 2 includes feedback information corresponding to the first HARQ process 2 (i.e., HARQ1 on CC2 in FIG. 14).

Figure 15:
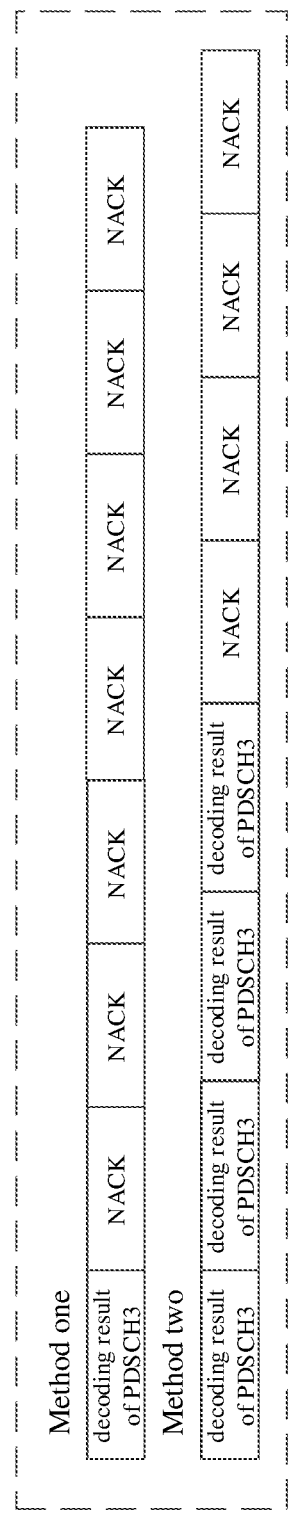
FIG. 15 is a schematic diagram of a HARQ-ACK codebook according to another example embodiment of the present disclosure.
Figure 16:
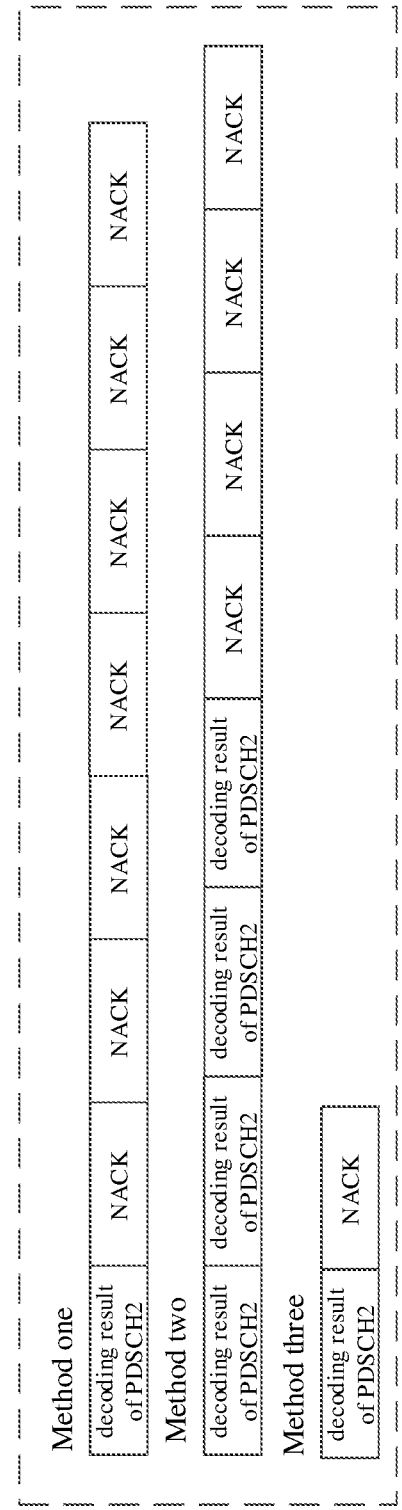
FIG. 16 is a schematic diagram of a HARQ-ACK codebook according to another example embodiment of the present disclosure.

Assuming that the maximum numbers of TBs on CC1 and CC2 are both 2, and the number of CBG feedback bits corresponding to each TB on CC1 is 2, the generation method of the first feedback information can be as shown in FIG. 15, the generation method of the second feedback information may be as shown in FIG. 16, and the target feedback sequence may be as shown in FIG. 17.

FIG. 18 is a schematic structural diagram of a HARQ-ACK codebook determination device according to an example embodiment of the present disclosure. The device may include a generation module 1810 and a determination module 1820.

The generation module 1810 is configured to generate first feedback information, wherein the first feedback information includes feedback information for a first physical channel, the first physical channel is a physical channel corresponding to a first Hybrid Automatic Repeat Request (HARQ) process on a first cell, the first cell supports a Code Block Group (CBG)-based feedback mode, and the first physical channel does not correspond to a CBG-based transmission mode.

The determination module 1820 is configured to determine a target feedback sequence, wherein the target feedback sequence includes feedback information ordered based on HARQ process numbers in N cells, the N cells includes the first cell, the feedback information ordered based on HARQ process numbers in the N cells includes the first feedback information, and N is a positive integer.

In a possible implementation of the present disclosure, the first physical channel not corresponding to the CBG-based transmission mode includes at least one of the following situations that:
  the first physical channel is a physical channel scheduled by first Downlink Control Information (DCI), and the first DCI is a DCI in a fallback mode format;
  the first physical channel is a semi-persistent scheduling physical channel;
  the first physical channel is a first Physical Downlink Control Channel (PDCCH), and the first PDCCH is used to indicate release of the semi-persistent scheduling physical channel, or the first PDCCH is used to indicate activation of the semi-persistent scheduling physical channel; and
  the first cell does not support the CBG-based transmission mode.

In a possible implementation of the present disclosure, the number of information bits included in the first feedback information is determined according to a CBG feedback length G and/or a Transport Block (TB) feedback length T, the CBG feedback length G is a CBG feedback length corresponding to one TB, the TB feedback length T is a TB feedback length on the first cell, G is a positive integer, and T is a positive integer.

In a possible implementation of the present disclosure, 1-bit HARQ-ACK information included in the first physical channel corresponds to G information bits in one sub-codebook included in the first feedback information, and the G information bits includes one of the following situations that:
  the first information bit in the G information bits is the 1-bit HARQ-ACK information, and/or, other information bits except the first information bit in the G information bits are NACK; or
  the G information bits are G repetitions of the 1-bit HARQ-ACK information.

In a possible implementation of the present disclosure, in response to a feedback mode including New Data Indicator (NDI) information being configured, the 1-bit HARQ-ACK information further corresponds to 1-bit NDI information, the sub-codebook further includes 1-bit NDI information, and the 1-bit NDI information in the sub-codebook is appended after the G information bits.

In a possible implementation of the present disclosure, the first feedback information includes one of the following situations that:
  T=1, the first feedback information includes one sub-codebook, the first physical channel includes 1-bit HARQ-ACK information, and the sub-codebook included in the first feedback information is a sub-codebook corresponding to the 1-bit HARQ-ACK information;
  T=2, the first feedback information includes two sub-codebooks, the first physical channel includes 1-bit HARQ-ACK information, and the first sub-codebook included in the first feedback information is a sub-codebook corresponding to the 1-bit HARQ-ACK information;
  T=2, the first feedback information includes two sub-codebooks, the first physical channel includes 2-bit HARQ-ACK information, the first sub-codebook included in the first feedback information is a sub-codebook corresponding to the first bit HARQ-ACK information in the 2-bit HARQ-ACK information, and the second sub-codebook included in the first feedback information is a sub-codebook corresponding to the second bit HARQ-ACK information in the 2-bit HARQ-ACK information;
  wherein if the first feedback information includes two sub-codebooks, the second sub-codebook included in the first feedback information is appended after the first sub-codebook included in the first feedback information.

In a possible implementation of the present disclosure, T=2, the first feedback information includes two sub-codebooks, the first physical channel includes 1-bit HARQ-ACK information, and the second sub-codebook included in the first feedback information is one of the following:
  the second sub-codebook includes G information bits, and the G information bits in the second sub-codebook are NACK; and
  the second sub-codebook includes G+1 information bits, the first G information bits in the G+1 information bits in the second sub-codebook are NACK, and the last information bit in the G+1 information bits in the second sub-codebook is a preset value.

In a possible implementation of the present disclosure, the CBG feedback length G is determined according to one of the following manners:
  when the first cell supports the CBG-based transmission mode, the CBG feedback length G is a CBG feedback length on the first cell; and
  when the first cell does not support the CBG-based transmission mode and a second cell of the N cells supports the CBG-based transmission mode, the CBG feedback length G is a GBG feedback length on the second cell.

In a possible implementation of the present disclosure, the second cell is a cell with a longest CBG feedback length among cells supporting the CBG-based transmission mode among the N cells; or, the second cell is a cell with a shortest CBG feedback length among cells supporting the CBG-based transmission mode among the N cells.

In a possible implementation of the present disclosure, the CBG feedback length G is determined according to a first configuration parameter of a network device; and/or the TB feedback length T is determined according to a second configuration parameter of the network device.

In a possible implementation of the present disclosure, the first cell supporting the CBG-based feedback mode includes:
the first cell is configured as the CBG-based feedback mode; or,
a Physical Uplink Control Channel (PUCCH) group or a cell group to which the first cell belongs is configured as the CBG-based feedback mode.

In a possible implementation of the present disclosure, in response to a feedback mode including NDI information being configured, the first feedback information further includes NDI information for the first physical channel, and the number of NDI information for the first physical channel included in the first feedback information is determined according to a maximum number of TBs on the first cell.

In a possible implementation of the present disclosure, the first physical channel is a semi-persistent scheduling physical channel, and the NDI information is a preset value.

In a possible implementation of the present disclosure, the N cells are all cells included in a PUCCH group or a cell group; or,
the N cells are activated cells among all cells included in a PUCCH group or a cell group.

In a possible implementation of the present disclosure, the target feedback sequence includes feedback information for all HARQ processes on the N cells, the feedback information for all HARQ processes on the N cells is ordered based on HARQ process numbers, and an ordering of the target feedback sequence is HARQ process number first and cell second.

In embodiments of the present disclosure, first feedback information is generated. The first feedback information includes feedback information for a first physical channel, the first physical channel is a physical channel corresponding to a first HARQ process on a first cell, the first cell supports a CBG-based feedback mode, and the first physical channel does not correspond to a CBG-based transmission mode. A target feedback sequence is determined. The target feedback sequence includes feedback information ordered based on HARQ process numbers in N cells, the N cells includes the first cell, the feedback information ordered based on HARQ process numbers in the N cells includes the first feedback information, and N is a positive integer. In embodiments of the present disclosure, a method for determining a HARQ-ACK codebook is proposed when the first physical channel does not correspond to the CBG-based transmission mode, but the first cell supports the CBG-based feedback mode.

Figure 19:
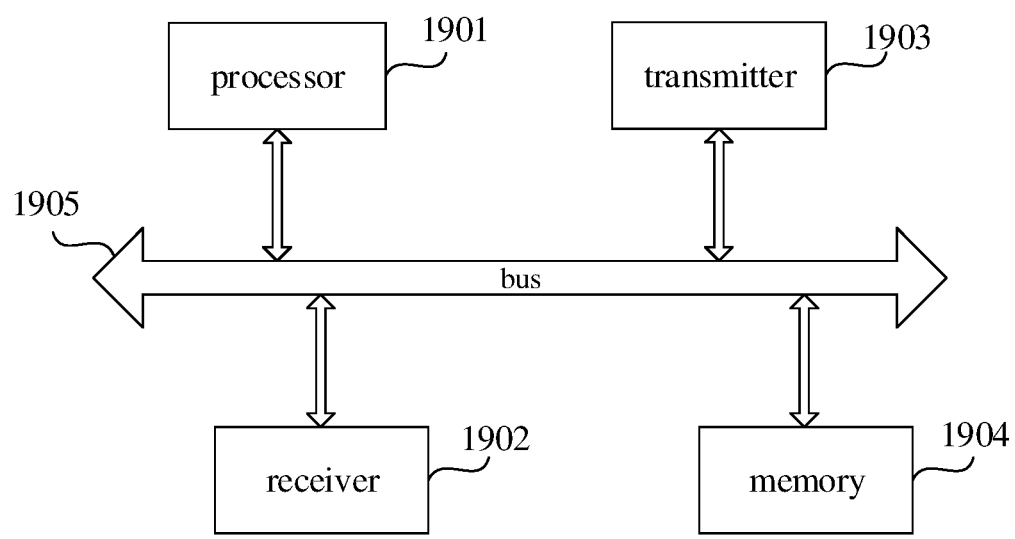
FIG. 19 is a schematic structural diagram of a device according to another example embodiment of the present disclosure.

FIG. 19 shows a schematic structural diagram of a device according to an exemplary embodiment of the present disclosure. The device may be a terminal device or a network device. The device includes: a processor 1901, a receiver 1902, a transmitter 1903, a memory 1904 and a bus 1905.

The processor 1901 includes one or more processing cores, and the processor 1901 executes various functional applications and information processing by running software programs and modules.

The receiver 1902 and the transmitter 1903 may be implemented as a communication component, which may be a communication chip.

The memory 1904 is connected to the processor 1901 through the bus 1905.

The memory 1904 may be configured to store at least one instruction, and the processor 1901 may be configured to execute the at least one instruction to implement various steps performed by the device in each of the foregoing method embodiments.

Additionally, memory 1904 may be implemented by any type or combination of volatile or non-volatile storage devices including, but not limited to, magnetic or optical disk, electrically erasable and programmable Read Only Memory (EEPROM), Erasable Programmable Read Only Memory (EPROM), Static Random Access Memory (SRAM), Read Only Memory (ROM), Magnetic Memory, Flash Memory, Programmable Read Only Memory (PROM).

An embodiment of the present disclosure provides a computer-readable storage medium, where at least one instruction is stored in the storage medium, and the at least one instruction is loaded and executed by the processor to implement the methods provided by the foregoing method embodiments.

An embodiment of the present disclosure also provides a computer program product. When the computer program product runs on a computer, the computer is caused to perform the methods provided by the above method embodiments.

Those of ordinary skill in the art can understand that all or part of the steps of implementing the above embodiments can be completed by hardware, or can be completed by instructing relevant hardware through a program, and the program can be stored in a computer-readable storage medium. The storage medium mentioned may be a read-only memory, a magnetic disk or an optical disk, etc.

The above are only example embodiments of the present disclosure, and are not intended to limit the present disclosure. Any modifications, equivalent replacements, improvements, etc. made within the spirit and principles of the present disclosure fall within the protection scope of the present disclosure.

What is claimed is:

1. A method for Hybrid Automatic Repeat Request Acknowledgement (HARQ-ACK) codebook determination, comprising:
generating first feedback information, wherein the first feedback information comprises feedback information for a first physical channel, the first physical channel is a physical channel corresponding to a first Hybrid Automatic Repeat Request (HARQ) process on a first cell, the first cell supports a Code Block Group (CBG)-based feedback mode, and the first physical channel does not correspond to a CBG-based transmission mode; and
determining a target feedback sequence, wherein the target feedback sequence comprises feedback information ordered based on HARQ process numbers in N cells, the N cells comprises the first cell, the feedback information ordered based on HARQ process numbers in the N cells comprises the first feedback information, and N is a positive integer.

2. The method according to claim 1, wherein the first physical channel not corresponding to the CBG-based transmission mode comprises at least one of the following situations that:

the first physical channel is a physical channel scheduled by first Downlink Control Information (DCI), and the first DCI is a DCI in a fallback mode format; and the first physical channel is a semi-persistent scheduling physical channel.

3. The method according to claim 1, wherein a number of information bits comprised in the first feedback information is determined according to at least one of a CBG feedback length G or a Transport Block (TB) feedback length T, the CBG feedback length G is a CBG feedback length corresponding to one TB, the TB feedback length T is a TB feedback length on the first cell, G is a positive integer, and T is a positive integer.

4. The method according to claim 3, wherein 1-bit HARQ-ACK information comprised in the first physical channel corresponds to G information bits in one sub-codebook comprised in the first feedback information, and the G information bits are G repetitions of the 1-bit HARQ-ACK information.

5. The method according to claim 4, wherein in response to a feedback mode comprising New Data Indicator (NDI) information being configured, the 1-bit HARQ-ACK information further corresponds to 1-bit NDI information, the sub-codebook further comprises the 1-bit NDI information, and the 1-bit NDI information in the sub-codebook is appended after the G information bits.

6. The method according to claim 4, wherein the first feedback information comprises the following situation that:

T=2, the first feedback information comprises two sub-codebooks, the first physical channel comprises 1-bit HARQ-ACK information, and a first sub-codebook comprised in the first feedback information is a sub-codebook corresponding to the 1-bit HARQ-ACK information;

wherein in response to the first feedback information comprising two sub-codebooks, a second sub-codebook comprised in the first feedback information is appended after the first sub-codebook comprised in the first feedback information.

7. The method according to claim 6, wherein T=2, the first feedback information comprises two sub-codebooks, the first physical channel comprises 1-bit HARQ-ACK information, and the second sub-codebook comprised in the first feedback information is one of the following:

the second sub-codebook comprises G information bits, and the G information bits in the second sub-codebook are NACK; and the second sub-codebook comprises G+1 information bits, first G information bits in the G+1 information bits in the second sub-codebook are NACK, and a last information bit in the G+1 information bits in the second sub-codebook is a preset value.

8. The method according to claim 3, wherein the CBG feedback length G is determined according to the following manner:

when the first cell supports the CBG-based transmission mode, the CBG feedback length G is a CBG feedback length on the first cell.

9. The method according to claim 3, wherein the CBG feedback length G is determined according to a first configuration parameter of a network device.

10. The method according to claim 1, wherein the first cell supporting the CBG-based feedback mode comprises:

a Physical Uplink Control Channel (PUCCH) group or a cell group to which the first cell belongs is configured as the CBG-based feedback mode.

11. The method according to claim 1, wherein:

the N cells are all cells comprised in a PUCCH group.

12. A device for Hybrid Automatic Repeat Request Acknowledgement (HARQ-ACK) codebook determination, comprising: a processor, a transceiver, memory and instructions stored in the memory that, when executed by the processor, cause the HARQ-ACK codebook determination device to:

generate first feedback information, wherein the first feedback information comprises feedback information for a first physical channel, the first physical channel is a physical channel corresponding to a first Hybrid Automatic Repeat Request (HARQ) process on a first cell, the first cell supports a Code Block Group (CBG)-based feedback mode, and the first physical channel does not correspond to a CBG-based transmission mode; and determine a target feedback sequence, wherein the target feedback sequence comprises feedback information ordered based on HARQ process numbers in N cells, the N cells comprises the first cell, the feedback information ordered based on HARQ process numbers in the N cells comprises the first feedback information, and N is a positive integer.

13. The device according to claim 12, wherein the first physical channel not corresponding to the CBG-based transmission mode comprises at least one of the following situations that:

the first physical channel is a physical channel scheduled by first Downlink Control Information (DCI), and the first DCI is a DCI in a fallback mode format; and the first physical channel is a semi-persistent scheduling physical channel.

14. The device according to claim 12, wherein a number of information bits comprised in the first feedback information is determined according to at least one of a CBG feedback length G or a Transport Block (TB) feedback length T, the CBG feedback length G is a CBG feedback length corresponding to one TB, the TB feedback length T is a TB feedback length on the first cell, G is a positive integer, and T is a positive integer.

15. The device according to claim 14, wherein 1-bit HARQ-ACK information comprised in the first physical channel corresponds to G information bits in one sub-codebook comprised in the first feedback information, and the G information bits are G repetitions of the 1-bit HARQ-ACK information.

16. The device according to claim 15, wherein in response to a feedback mode comprising New Data Indicator (NDI) information being configured, the 1-bit HARQ-ACK information further corresponds to 1-bit NDI information, the sub-codebook further comprises the 1-bit NDI information, and the 1-bit NDI information in the sub-codebook is appended after the G information bits.

17. The device according to claim 15, wherein the first feedback information comprises one of the following situations that:

T=2, the first feedback information comprises two sub-codebooks, the first physical channel comprises 1-bit HARQ-ACK information, and a first sub-codebook comprised in the first feedback information is a sub-codebook corresponding to the 1-bit HARQ-ACK information;

wherein in response to the first feedback information comprising two sub-codebooks, a second sub-codebook comprised in the first feedback information is appended after the first sub-codebook comprised in the first feedback information.

18. The device according to claim 17, wherein T=2, the first feedback information comprises two sub-codebooks, the first physical channel comprises 1-bit HARQ-ACK information, and the second sub-codebook comprised in the first feedback information is one of the following:

the second sub-codebook comprises G information bits, and the G information bits in the second sub-codebook are NACK; and the second sub-codebook comprises G+1 information bits, first G information bits in the G+1 information bits in the second sub-codebook are NACK, and a last information bit in the G+1 information bits in the second sub-codebook is a preset value.

19. The device according to claim 14, wherein the CBG feedback length G is determined according to the following manner:

when the first cell supports the CBG-based transmission mode, the CBG feedback length G is a CBG feedback length on the first cell.

20. The device according to claim 14, wherein the CBG feedback length G is determined according to a first configuration parameter of a network device.

* * * * *